United States Patent [19]

Dearman

[11] Patent Number: 4,930,825
[45] Date of Patent: Jun. 5, 1990

[54] APPARATUS FOR UPROOTING PLANTS

[76] Inventor: Timothy C. Dearman, P.O. Box 737, Mansfield, Tex. 76063

[21] Appl. No.: 331,842

[22] Filed: Apr. 3, 1989

[51] Int. Cl.⁵ .............................................. A01B 1/18
[52] U.S. Cl. .................................... 294/50.9; 81/367; 172/378; 294/104
[58] Field of Search .................... 294/103.1, 104, 50.6, 294/50.8, 50.9, 50.5; 128/337, 333; 81/367, 381, 367, 117; 172/371, 378; 56/332, 333

[56] References Cited

U.S. PATENT DOCUMENTS

| | | | |
|---|---|---|---|
| 663,628 | 12/1900 | Hiett | 294/50.9 |
| 847,841 | 3/1907 | Stanley | 294/104 |
| 901,820 | 10/1908 | Nelson | 294/50.8 |
| 941,644 | 11/1909 | Miller | 294/104 X |
| 2,309,948 | 2/1943 | Goebel | 56/333 |
| 3,276,805 | 10/1966 | Lambert | 294/50.9 X |
| 3,937,512 | 2/1976 | Baughman | 294/50.9 |
| 4,147,329 | 4/1979 | Rodriguez | 294/50.9 |
| 4,243,206 | 1/1981 | Heikkinen et al. | 294/50 |
| 4,547,010 | 10/1985 | Camp | 294/50.9 |

*Primary Examiner*—Richard J. Johnson
*Attorney, Agent, or Firm*—Learman & McCulloch

[57] ABSTRACT

Plant uprooting apparatus having a pair of jaws movable relatively to one another between open and closed positions in response to movements by a person of an actuating grip and linkage. The movement in one direction of the grip is limited so that the force that must be exerted by the person to maintain the jaws in their closed position is minimal.

14 Claims, 2 Drawing Sheets

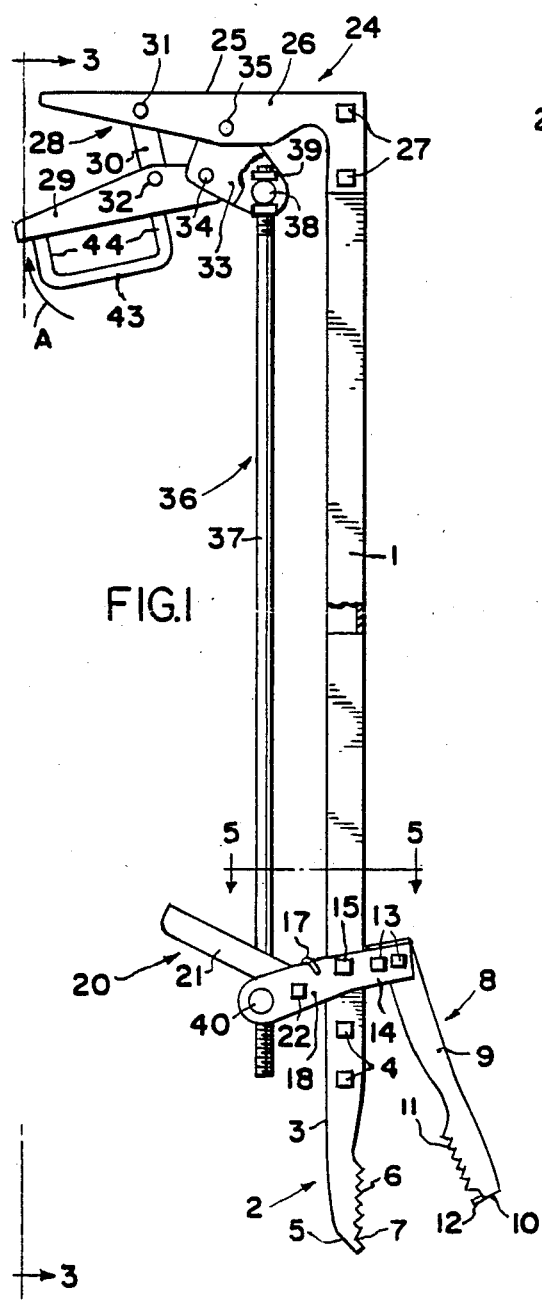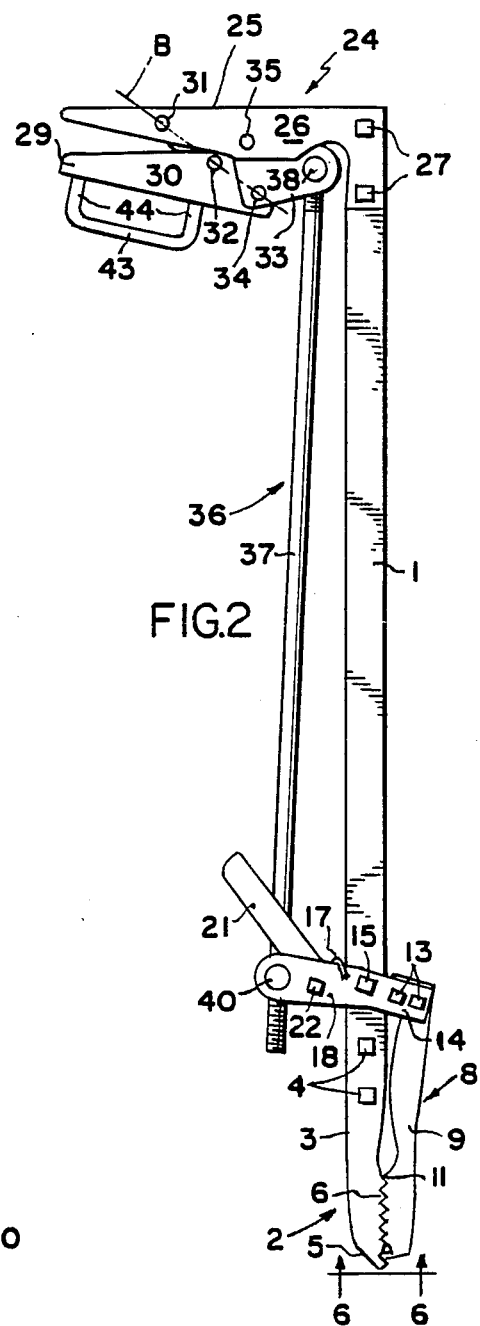

APPARATUS FOR UPROOTING PLANTS

This invention relates to apparatus for uprooting plants and more particularly to a manually operable tool which enables a person to uproot or extract a growing plant from the ground without having to bend, stoop, kneel, or handle the plant.

BACKGROUND OF THE INVENTION

A substantial number of manually operable weeding tools have been proposed heretofore, including some which are designed to be operated by a person in an erect position, thereby avoiding the necessity of the person's bending, stooping, or kneeling during the uprooting of a weed. For the most part the prior art devices have been less than successful commercially because of certain disadvantages associated therewith. One of the disadvantages of prior art devices of the kind referred to is that they employ plant engageable grippers or jaws which engage the plant stem at or above ground level. The engagement of a plant stem at or above ground level under sufficient force to uproot the plant more often than not causes the stem to be severed from its root, thereby leaving the root in the ground in condition for further growth.

Another problem associated with the known weeding tools is that the force required to move the plant gripping jaws to their gripping position increases as the jaws move toward such position. Such force must be maintained as long as the jaws are in their plant gripping position and, as a result, the user soon becomes weary, thereby limiting the use of the tool.

A principal object of the present invention is to provide a weeding tool of the general class referred to and which overcomes the problems discussed above.

SUMMARY OF THE INVENTION

Apparatus constructed in accordance with the invention comprises an elongate support terminating at one end in a pair of relatively movable, plant straddling jaws and at the other end in a handle and actuating means for effecting pivotal movements of the jaws between open and closed postions. The actuating means includes a grip which is pivotally connected to the handle by a link and which also is pivotally connected to an operating crank having a pivotal connection to the handle. The operating crank is coupled to one of the jaws by a force transmitting member so as to transmit movement of the actuating means to the movable jaw.

The jaws are biased by a spring to their open position, but the bias of the spring may be overcome by movement in one direction of the actuating means. The actuating means is so constructed that, when the jaws reach their closed position, the force that must be exerted on the actuating means to maintain the jaws in such position is minimal.

The closed position of the jaws is adjustable so as to minimize the possibility of the jaws being moved so close to one another as to sever a plant engaged by the jaws.

THE DRAWINGS

Apparatus constructed in accordance with a preferred embodiment of the invention is disclosed in the accompanying drawings, wherein:

FIG. 1 is a side elevational view, with parts broken away, of the apparatus with the plant gripping jaws in their open position;

FIG. 2 is a view similar to FIG. 1, but illustrating the jaws in their closed position;

THE PREFERRED EMBODIMENT

Figure 4:
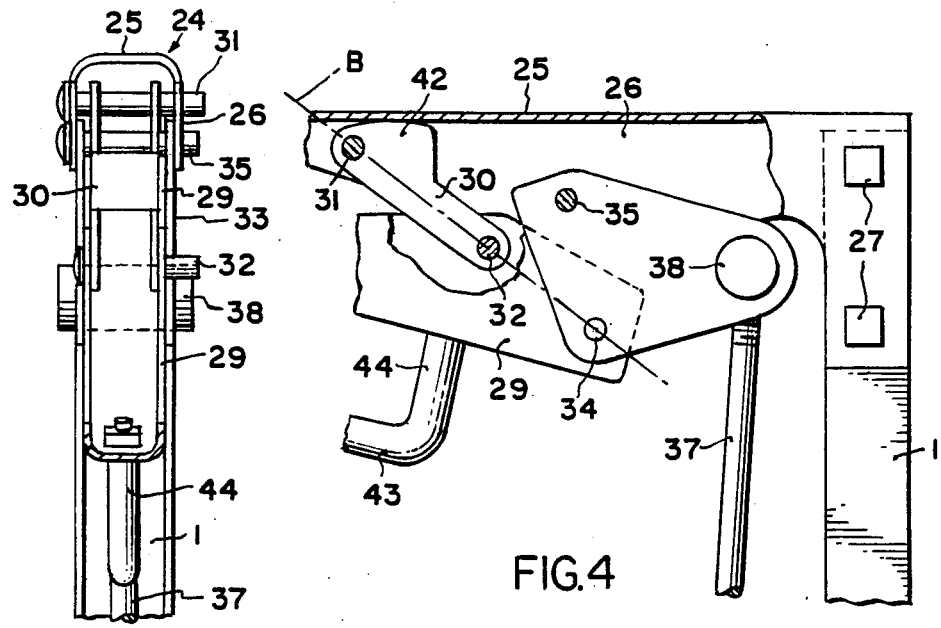
FIG. 4 is a greatly enlarged fragmentary view, partly in section, illustrating the actuating mechanism in the position it occupies when the jaws are in their closed position.

Apparatus constructed in accordance with the disclosed embodiment comprises an elongate, channel-shaped support 1 terminating at one end in a jaw 2. The jaw comprises a pair of spaced apart, parallel arms 3 fixed at corresponding ends by bolts 4 on opposite sides of the support 1. The opposite ends of the arms 3 are joined by a transverse web 5. Corresponding edges of the arms 3 and the web 5 are provided with teeth 6 and 7 respectively.

The apparatus includes a companion jaw 8 comprising a pair of spaced, parallel arms 9 joined at corresponding ends by a web 10. The arms 9 and the web 10 are provided with teeth 11 and 12, respectively, which are adapted to confront and mesh with the teeth 6 and 7 of the jaw 2.

The arms 9 of the jaw 8 are fixed at their opposite ends means of bolts 13 to a clevis 14 which is pivoted between its ends to the support 1 by a pivot pin 15. A torsion spring 16 encircles the pivot pin 15 and has one end 17 anchored to a leg 18 of the clevis 14 and its opposite end fixed to the support 1 so as to bias the jaw 8 to its open position relative to the jaw 2, as is shown in FIG. 1.

The apparatus includes a force applying member 20 comprising a pair of parallel bars 21 pivoted to the legs 18 of the clevis 14 by a pivot pin 22, the corresponding ends of the bars 21 being joined by a cross bar 23. The purpose of the force applying member 20 will be explained shortly.

At the opposite or upper end of the support 1 is secured a handle 24 having a top wall 25 flanked by depending flanges 26. The handle is secured to the support 1 by suitable bolts 27 or the like.

An actuating mechanism 28 is provided for moving the jaws 2 and 8 between their open and closed positions. The actuating mechanism comprises a grip 29 which underlies the handle 24 and is connected thereto by a link 30 one end of which is pivoted at a first point to the handle flanges 26 by a pin 31 and the opposite end of which is pivoted at a second point to the grip 29 by a pin 32. The grip 29 also is pivoted at a third point to an operating crank 33 by a pin 34, and the crank 33 is pivoted at a fourth point to the flanges 26 of the handle 24 by a pivot pin 35. The pivots 31, 32, and 34, together with the link 30 and that part of the grip 29 between the pivots 32 and 34, constitute, in effect, a toggle linkage.

Force transmitting or coupling means 36 is provided to transmit movement of the operating crank 33 to the movable jaw 8 and comprises an elongate rod 37 adjustably secured at its upper end to a stub shaft 38 that is rotatably accommodated in an opening formed in the crank 33. That end of the rod 37 which extends through the shaft 38 is threaded and provided with adjustable lock nuts 39 by means of which the position of the rod 37 may be adjusted and fixed relative to the shaft 38.

At its lower end the rod 37 extends through an opening formed in a second stub shaft 40 that is rotatably accommodated in openings formed in the legs 18 of the clevis 14. That end of the rod 37 which extends through the shaft 40 is threaded and receives adjustable nuts 41 by means of which the position of the rod relative to the shaft 40 may be fixed in any selected one of a number of adjusted positions.

When the apparatus is conditioned for operation, the parts will assume the positions shown in FIG. 1 inasmuch as the spring 16 biases the jaws 2 and 8 to their open position. Movement of the grip 29 in the direction of the arrow A from the position shown in FIG. 1 toward the position shown in FIG. 2 effects counterclockwise movement of the operating crank 33 about the pivot 35, thereby causing the force transmitting rod 37 to rock the clevis 14 clockwise about its pivot 15 and move the jaw 8 toward the jaw 2.

As the operating crank 33 rocks counterclockwise about the pivot 35, the pivots 31, 32, and 34 approach an aligned position indicated by the straight line B in FIG. 2. As the pivots 31, 32, and 34 approach the aligned position, a movement limiting cam 42 forming part of the link 30 abuts the inner surface of the handle wall 25 and limits further movement of the grip 29 toward the handle. In these positions of the parts the force required to maintain the jaws in their closed position is minimal. To facilitate return movement of the grip 29 to the position shown in FIG. 1, it may include a bail 43 having arms 44 which extend through openings in the grip 29 and are fixed in position by nuts 45.

In operation, a person may hold the apparatus in one hand with the palm overlying the handle 24 and the fingers extending through the bail 43 and under the grip 29. The apparatus then may be placed in a position such that the two jaws straddle a plant that is to be uprooted and the apparatus rocked about the axis of the support 1 and from side-to-side to enable the jaw 2 partially to be embedded in the ground. If the ground is hard, the user's foot may be placed on the member 20 to facilitate embedding the jaw 2 in the ground.

After the lower end of the jaw 2 has been embedded in the ground, the actuating mechanism 28 may be operated to cause the jaw 8 to move toward the jaw 2. Since the space between the arms 9 of the jaws 8 is open, little resistance to movement of the jaw web 10 into and through the ground is encountered. Thus, the web 10 may be moved into close relation with the jaw web 5 so as to grip the root of the plant between the jaws and below ground level. Once the root of the plant has been gripped, the user may apply an upward force on the apparatus to extract the plant, including its root.

As is clear from FIG. 1, the left-hand end of the clevis 14 is at a level below the pivot 15 when the jaw 8 is in its open position. Therefore, the effective moment arm between the pivot 15 and the shaft 40 is at a maximum as the jaw 8 rocks clockwise toward the position shown in FIG. 2. Thus, upward movement of the force transmitting means 36 enables a maximum force to be exerted thereby on the jaw 8 to move it toward its closed position.

Figure 5:
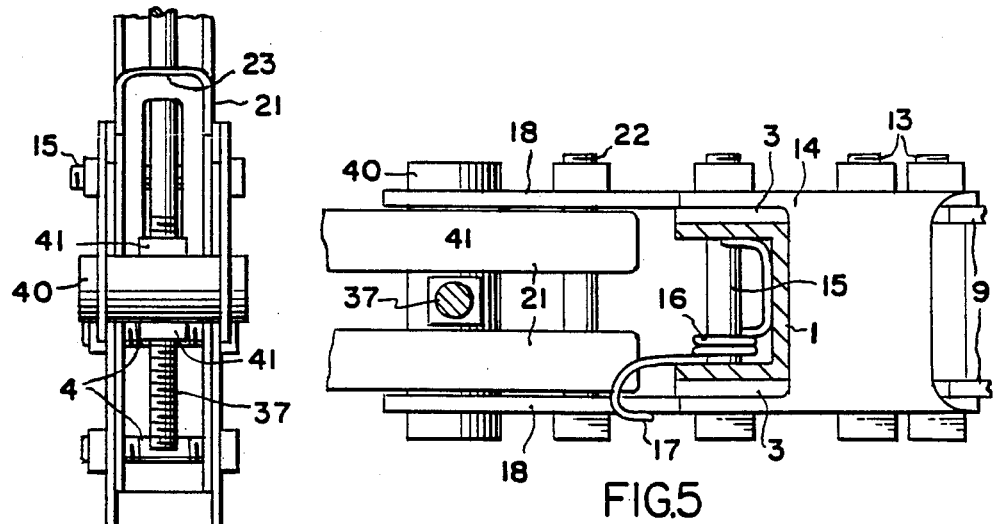
FIG. 5 is a cross sectional view taken on the line 5—5 of FIG. 1.
Figure 3:
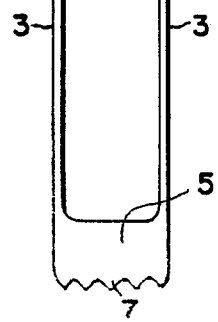
FIG. 3 is an end elevational view of the apparatus and taken on the line 3—3 of FIG. 1.
Figure 6:
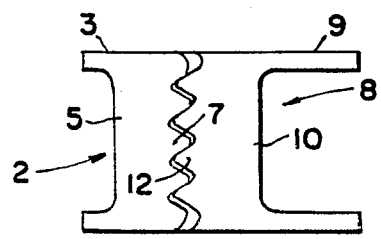
FIG. 6 is a bottom plan view taken on the line 6—6 of FIG. 2.

If the jaws 2 and 8 move to their fully closed position as shown in FIGS. 2 and 5, the root of the plant may be severed between its upper and lower ends. To prevent this from occurring, the length of the force transmitting rod 37 between the shafts 38 and 40 may be adjusted via the nuts 39 and 41 so that, when the grip 29 has been moved toward the handle 24 as far as is permitted by the limiting cam 42, a gap of selected width will exist between the jaw webs 5 and 10, thereby enabling the teeth 7 and 12 to engage the plant root, but not sever it.

Although the spring 16 exerts a constant force on the actuating mechanism biasing the jaws to their open position, such force easily may be overcome merely by maintaining the grip in a position in which the pivots 31, 32, and 34 are in alignment. In this position of the grip the force that must be exerted by the user on the grip is less than that required to move the grip from the position shown in FIG. 1 to that shown in FIG. 2.

The cam 42 is so formed that its abutment with the handle 24 prevents movement of the link 30 and the crank 33 to a position in which the pivot 34 moves toward the handle beyond the straight line alignment. Consequently, the force applied on the plant by the jaws will not be diminished by excess movement of the grip.

The apparatus not only is useful as a plant extractor; it also may be used to pick up papers, cans, and other litter.

The disclosed embodiment is representative of a presently preferred form of the invention, but is intended to be illustrative rather than definitive. The invention is defined in the claims.

I claim:

1. Apparatus adapted for the uprooting of a plant comprising an elongate support terminating at one end in a first jaw and at its opposite end in a handle; a second jaw; means mounting said second jaw on said support for relative movements of said jaws between a first, open position and a second, plant gripping position; and actuating means for effecting said movements of said jaws, said actuating means comprising a grip, a link pivoted to said handle at a first point and to said grip at a second point, said grip being pivoted to a crank at a third point and said crank being pivoted to said handle at a fourth point, and force transmitting means coupling said second jaw to said crank, said actuating means being responsive to the application of force on said grip to move it in a direction toward said handle to rock said link and crank about the respective pivot points and enable said force transmitting means to move said jaws from said first position toward said second position, said pivot points being so positioned relative to one another that when said jaws are in their second position the force required to be exerted on said grip to maintain said jaws in said second position is minimal.

2. Apparatus according to claim 1 wherein said first jaw is fixed on said support and said second jaw is pivoted on said support.

3. Apparatus according to claim 1 wherein said link includes an abutment engageable with said handle for limiting movement of said grip in a direction toward said handle.

4. Apparatus according to claim 1 including spring means yieldably biasing said jaws to said first position.

5. Apparatus according to claim 1 including means for applying a force on said first jaw for embedding a lower position thereof in earth.

6. Apparatus according to claim 1 wherein each of said jaws comprises a pair of spaced apart arms joined at corresponding ends by a cross member, the arms and cross member of one of said jaws confronting the arms and cross member of the other of said jaws.

7. Apparatus according to claim 6 wherein the cross member of at least one of said jaws has teeth confronting the cross member of the other of said jaws.

8. Apparatus according to claim 6 wherein the cross member of each of said jaws has teeth confronting the cross member of the other of said jaws.

9. Apparatus according to claim 8 wherein a teeth mesh when said jaws are in their closed position.

10. Apparatus according to claim 1 including means for limiting movement of said grip in said direction.

11. Apparatus according to claim 1 including adjustable means for limiting relative movement of said jaws toward said second position.

12. Apparatus for uprooting a growing plant comprising a support; a pair of plant straddling jaws carried by said support at one end thereof for relative movements between a first, open position and a second, plant clamping position; a handle carried by said support at its opposite end; an operating crank pivoted to said handle for rocking movements; coupling means connecting said operating crank and one of said jaws for effecting said relative movements thereof in response to rocking movements of said operating crank; actuating means for rocking said operating crank, said actuating means comprising a grip and linkage means pivoting said grip to said operating crank and to said handle, said linkage means enabling movements of said grip toward and away from said handle and effecting rocking movements of said operating crank in response to said movements of said grip; and limit means acting between said linkage and said handle means for limiting movements of said grip in a direction toward said handle, said limit means preventing further movement of said grip toward said handle when said jaws are in their second position.

13. Apparatus according to claim 12 wherein said limit means comprises an abutment engageable with said handle.

14. Apparatus according to claim 12 wherein said coupling means is adustable to limit relative movement of said jaws toward said second position.

* * * * *

UNITED STATES PATENT AND TRADEMARK OFFICE
CERTIFICATE OF CORRECTION

PATENT NO. : 4,930,825
DATED : June 5, 1990
INVENTOR(S) : Timothy C. Dearman

It is certified that error appears in the above-identified patent and that said Letters Patent is hereby corrected as shown below:

Column 5, line 9, change "a" to -- said --.

Signed and Sealed this

Fourteenth Day of June, 1994

BRUCE LEHMAN

Attest:

Attesting Officer

Commissioner of Patents and Trademarks